(12) United States Patent
Kim

(10) Patent No.: US 11,559,886 B2
(45) Date of Patent: Jan. 24, 2023

(54) ROBOT AND OPERATION METHOD THEREOF

(71) Applicant: LG ELECTRONICS INC., Seoul (KR)

(72) Inventor: Jung Sik Kim, Gyeonggi-do (KR)

(73) Assignee: LG ELECTRONICS INC., Seoul (KR)

(*) Notice: Subject to any disclaimer, the term of this patent is extended or adjusted under 35 U.S.C. 154(b) by 597 days.

(21) Appl. No.: 16/589,340

(22) Filed: Oct. 1, 2019

(65) Prior Publication Data
US 2020/0030972 A1 Jan. 30, 2020

(30) Foreign Application Priority Data
Aug. 29, 2019 (KR) .................. 10-2019-0106780

(51) Int. Cl.
*B25J 9/16* (2006.01)
*B25J 13/08* (2006.01)
*G06N 20/00* (2019.01)

(52) U.S. Cl.
CPC ............ *B25J 9/163* (2013.01); *B25J 9/1638* (2013.01); *B25J 9/1666* (2013.01); *B25J 13/081* (2013.01); *G06N 20/00* (2019.01)

(58) Field of Classification Search
CPC ......... B25J 9/00; B25J 9/10; B25J 9/12; B25J 9/16; B25J 9/126; B25J 9/163; B25J 9/1628; B25J 9/1656; B25J 9/1664; B25J 9/1638; B25J 9/1666; B25J 13/00; B25J 13/08; B25J 13/081; B25J 11/00; B25J 11/008; B25J 5/00; B25J 5/007; B25J 19/00; B25J 19/0004; B25J 19/0008; B25J 19/02; B25J 19/0012; B25J 19/0016; B25J 19/021; B25J 19/022; B25J 19/023; B25J 19/025; B25J 19/026; B25J 19/027; B25J 19/028; G06N 20/10; G06N 20/20; G06N 20/00; G06N 3/00; G06N 3/02; G06N 3/08; G06N 3/084; G05B 2219/00;
(Continued)

(56) References Cited

U.S. PATENT DOCUMENTS

2008/0073138 A1* 3/2008 Asogawa ............. B62D 5/0418
180/209
2020/0361078 A1* 11/2020 Kato ........................ B25J 9/161

FOREIGN PATENT DOCUMENTS

| KR | 20180042975 A | * | 4/2018 | ............... B62B 5/00 |
| KR | 10-2018-0123298 | | 11/2018 | |
| KR | 10-2019-0089794 | | 7/2019 | |

* cited by examiner

*Primary Examiner* — Khoi H Tran
*Assistant Examiner* — Sarah A Tran
(74) *Attorney, Agent, or Firm* — Ked & Associates, LLP

(57) ABSTRACT

A robot and an operation method thereof are disclosed. A robot may include a loading box provided to load goods, and to be movable at a certain distance with respect to the robot when closed and opened, a drive wheel configured to drive the robot, an auxiliary wheel provided at a position spaced apart from the drive wheel, and a variable supporter configured to change the position of the auxiliary wheel, and supporting the loading box, and the variable supporter may move the auxiliary wheel so as to correspond to the movement direction of the center of gravity of the robot. The robot may transmit and receive a wireless signal on the mobile communication network constructed according to a 5 Generation (G) communication.

18 Claims, 8 Drawing Sheets

(A)

(B)

(58) Field of Classification Search
CPC ............ G05B 2219/30; G05B 2219/39; G05B 2219/39176; G05B 2219/39194
USPC ........................................................ 700/245
See application file for complete search history.

ROBOT AND OPERATION METHOD THEREOF

CROSS-REFERENCE TO APPLICATION

This present application claims benefit of priority to Korean Patent Application No. 10-2019-0106780, entitled "ROBOT AND OPERATION METHOD THEREOF," filed on Aug. 29, 2019, in the Korean Intellectual Property Office, the entire disclosure of which is incorporated herein by reference.

BACKGROUND

1. Technical Field

An embodiment relates to a robot and an operation method thereof, and more particularly, to a robot and an operation method thereof capable of loading goods and enabling autonomous driving.

2. Description of-Related Art

Description of this section only provides the background information of embodiments without configuring the related art.

The development and dissemination of an artificial intelligence robot is a trend that is rapidly spreading. Accordingly, when a client has made a purchase of goods, rather than having the client directly receive the shipped goods, it may be possible to improve the convenience of the client by having a home robot, which is stationed at the client's residential address to assist in the daily life of the client, receive the delivered goods instead.

In addition, the delivery of goods is being increasingly performed by intelligent artificial delivery robots instead of conventional human operators, and such delivery of goods using artificial intelligent robots is becoming increasingly popular and commercialized.

Korean Patent Laid-Open Publication No. 10-2018-0123298 discloses a delivery robot device. This document proposes a delivery robot device, an operation method thereof, and a service server, which may deliver the delivery goods collected by a delivery person in each delivery area to an original destination through a delivery robot device located for each delivery area (for example, building, apartment, mall), thereby overall improving security and convenience in the delivery service.

Meanwhile, a robot may be provided to move for the delivery of goods. In addition, for efficient delivery of goods, the robot may be provided to enable autonomous driving.

Korean Patent Laid-Open Publication No. 10-2019-0089794 discloses a mobile robot and an operation method thereof, which may communicate with peripheral devices through a 5G communication environment, and efficiently perform clean through machine learning based on such communication.

The robot loads and moves the goods to the delivery destination, and then withdraws the goods from the delivery destination. In addition, the robot loads or withdraws the delivery of the goods.

In the process of various operations of the robot for the delivery of such goods, the center of gravity of the robot loaded with the goods may move, and if the robot correctly does not cope with such movement of the center of gravity, the robot may overturn. There is a need for improvement of this problem.

SUMMARY OF THE DISCLOSURE

An embodiment of the present disclosure is to provide a robot having a structure capable of preventing overturning during a movement process.

Another embodiment is to provide an operation method of the robot capable of effectively coping with the movement of the center of gravity in the movement process, thereby preventing the overturning caused by the movement of the center of gravity.

Still another embodiment is to provide a method for estimating the position of the center of gravity of the robot through machine learning.

The objects to implement in embodiments are not limited to the technical problems described above and other objects that are not stated herein will be clearly understood by those skilled in the art from the following specifications.

For achieving the objects, a robot may include a loading box provided to load goods, and to be movable at a certain distance with respect to the robot when closed and opened, a drive wheel configured to drive the robot, an auxiliary wheel provided at a position spaced apart from the drive wheel, and a variable supporter configured to change the position of the auxiliary wheel, and supporting the loading box, and the variable supporter may move the auxiliary wheel so as to correspond to the movement direction of the center of gravity of the robot.

The robot may be provided to enable autonomous driving.

The variable supporter may include a motor, a linear mover mounted with the auxiliary wheel, and for moving linearly, a guider having one side fixed to the motor, and having the other side couple to the linear mover so that the linear mover is movable, and a screw having one side coupled to a rotary shaft of the motor to rotate together according to the rotation of the motor and having the other side coupled to the linear mover so that the linear mover is movable, and converting the rotational motion of the motor into the linear motion of the liner mover.

The variable supporter may move the auxiliary wheel in a first direction so that a first length measured from the drive wheel to the auxiliary wheel in the first direction is equal to or longer than a second length measured from the drive wheel to the center of gravity of the robot in the first direction.

The loading box may be provided in a plurality of floors, and each floor may be provided with a pressure sensor configured to measure the weight distribution of the goods loaded in the loading box.

The robot may estimate a position of the center of gravity of the robot based on the weight distribution of the goods measured from the pressure sensor and a structure of the robot.

The robot may hold the center of gravity data, which is information on the position of the center of gravity of the robot, according to the weight distribution of the goods and the movement of the loading box, and adjust a first length of the variable supporter measured from the drive wheel to the auxiliary wheel in a first direction based on the center of gravity data.

The center of gravity data may hold information on the position of the center of gravity of the robot according to the weight distribution of the goods loaded in the loading box, the floor number loaded with the goods in the loading box, the movement distance of the loading box when the loading box is open, and the number of floors of the loading box.

The center of gravity data may be derived by machine learning.

The center of gravity data may be derived by supervised learning.

The supervised learning may be performed so that training data infers labeling data, which is a pre-derived result value of the center of gravity data, and derive the functional relationship between the position of the center of gravity of the robot, which is an output value, and an input value specifying the position of the center of gravity.

The center of gravity data may hold information on the position of the center of gravity of the robot in each condition, in which at least one of a plurality of input values has been learned in different conditions, during the machine learning for deriving the center of gravity data of the robot.

The input value may include the weight distribution of the goods loaded in the loading box, the floor number loaded with the goods in the loading box, the movement distance of the loading box when the loading box is open, and the number of floors of the loading box.

The robot may further include a support wheel located to be spaced apart from each of the drive wheel and the auxiliary wheel, and for supporting the robot.

The variable supporter may adjust the movement speed of the auxiliary wheel so as to correspond to the movement speed of the center of gravity of the robot.

The robot may further include a sensing sensor configured to sense an external obstacle, and the variable supporter may adjust the movement distance of the auxiliary wheel so that the distance between the obstacle sensed by the sensing sensor and the auxiliary wheel are spaced at a certain distance apart from each other.

An operation method of a robot may include selecting a floor loaded with goods to be withdrawn from a loading box provided in a plurality of floors, measuring the weight distribution of the goods loaded on the selected floor, estimating the position of the center of gravity of the robot based on the weight distribution of the goods and a structure of the robot when the selected floor is open, setting the movement distance of an auxiliary wheel according to the estimated center of gravity of the robot, moving, by a variable supporter, the auxiliary wheel by the set movement distance, and opening the selected floor, and the variable supporter may move the auxiliary wheel so as to correspond to the movement direction of the center of gravity of the robot, and move the auxiliary wheel in a first direction so that a first length measured from a drive wheel of the robot to the auxiliary wheel in the first direction is equal to or longer than a second length measured from the drive wheel to the center of gravity of the robot in the first direction.

The operation method of the robot may further include loading the goods in the loading box, and in the loading the goods, the variable supporter may move the auxiliary wheel to the maximum distance at which the auxiliary wheel is movable.

The loading the goods may include selecting a floor on which the goods are loaded in the loading box, moving, by the variable supporter, the auxiliary wheel to the maximum position at which the auxiliary wheel is movable, opening the selected floor, loading the goods on the selected floor, and closing the floor loaded with the goods.

In an embodiment, it is possible to move the auxiliary wheel of the robot in the outside direction of the robot to stably support the robot, thereby effectively suppressing the overturning of the robot due to the movement of the center of gravity even if the loading box of the robot is open and the center of gravity of the robot loaded with the goods moves.

In an embodiment, it is possible to effectively derive the position of the center of gravity of the robot, which changes due to the weight and shape of the goods loaded on the robot, the overall shape of the robot loaded with the goods, the position movement of the loading box, and the like through machine learning.

It is possible to move the auxiliary wheel in the first direction corresponding to the derived position of the center of gravity to stable support the robot, thereby effectively suppressing the overturning of the robot due to the position change of the center of gravity of the robot.

DETAILED DESCRIPTION

Figure 1:
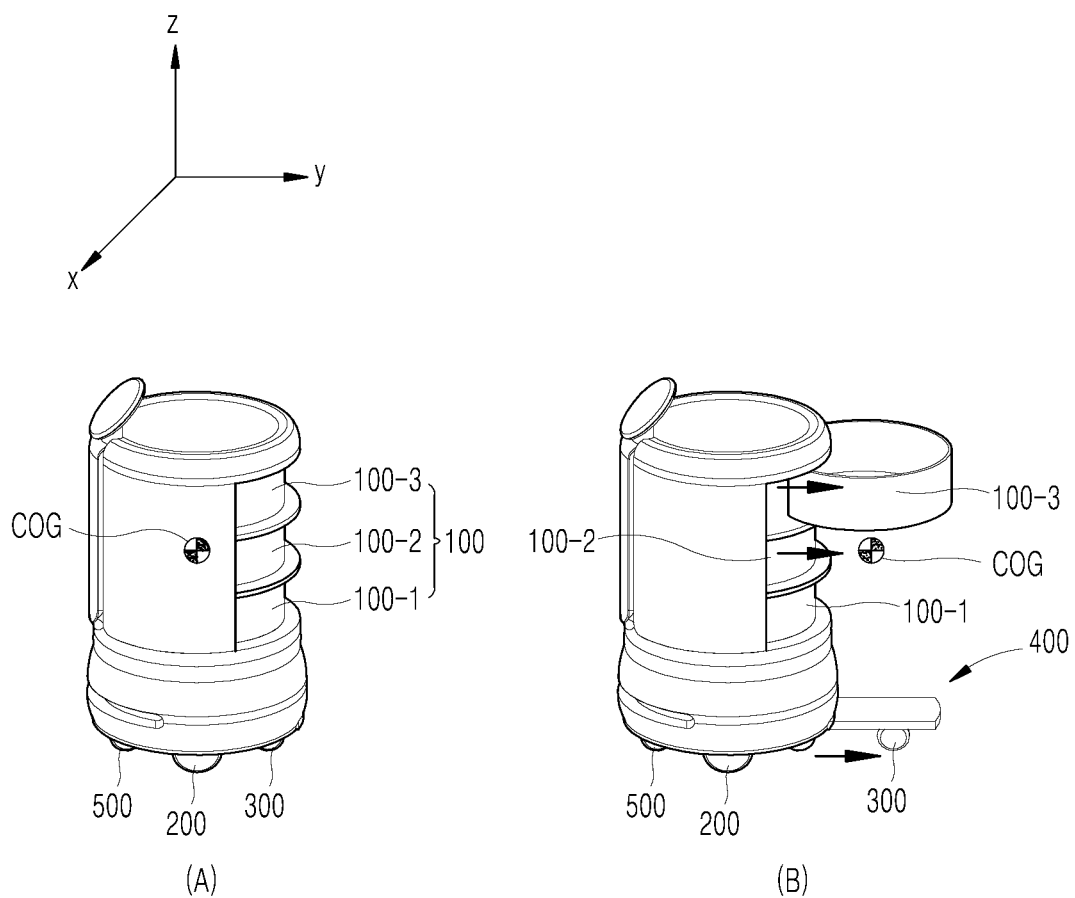
FIG. 1 is a flowchart illustrating a robot according to an embodiment.

Hereinbelow, embodiments will be described in greater detail with reference to the accompanying drawings. The embodiments may be modified in various ways and may have various forms, and specific embodiments will be illustrated in the drawings and will be described in detail herein. However, this is not intended to limit the embodiments to the specific embodiments, and the embodiment should be understood as including all modifications, equivalents, and replacements that fall within the spirit and technical scope of the embodiments.

Terms such as "first," "second," and other numerical terms when used herein do not imply a sequence or order unless clearly indicated by the context. These terms are generally only used to distinguish one element from another. In addition, terms, which are specially defined in consideration of the configurations and operations of the embodiments, are given only to explain the embodiments, and do not limit the scope of the embodiments.

In the description of the embodiment, in the case in which it is described as being formed on "on" or "under" of each element, "on" or "under" includes two elements directly contacting each other or one or more other elements being indirectly formed between the two elements. In addition, when expressed as "on" or "under", it may include not only upwards but also downwards with respect to one element.

In addition, relational terms to be described below such as "on/over/up" and "beneath/under/down" may be used to discriminate any one subject or element from another subject or element without necessarily requiring or comprehending a physical or logical relationship or sequence of subjects or elements.

In addition, in the drawing, a rectangular coordinate system (x, y, z) may be used. In the drawings and the following description, a direction substantially horizontal with the ground surface (GROUND) has been defined as a first direction, and the first direction has been expressed as the y-axis direction in the drawing.

FIG. 1 is a flowchart illustrating a robot according to an embodiment. A robot may refer to a machine which automatically handles a given task by its own ability, or which operates autonomously. In particular, a robot having a function of recognizing an environment and performing an operation according to its own judgment may be referred to as an intelligent robot.

Robots may be classified into industrial, medical, household, and military robots, according to the purpose or field of use.

A robot may include a driving unit in order to perform various physical operations, such as moving joints of the robot. Moreover, a movable robot may include, for example, a wheel, a brake, and a propeller in the driver thereof, and through the driver may thus be capable of traveling on the ground or flying in the air.

The robot of an embodiment may, for example, serve to load goods and deliver the loaded goods, and be provided to enable autonomous driving.

Autonomous driving refers to a technology in which driving is performed autonomously, and an autonomous vehicle refers to a vehicle capable of driving without manipulation of a user or with minimal manipulation of a user.

For example, autonomous driving may include a technology in which a driving lane is maintained, a technology such as adaptive cruise control in which a speed is automatically adjusted, a technology in which a vehicle automatically drives along a defined route, and a technology in which a route is automatically set when a destination is set.

A vehicle includes a vehicle having only an internal combustion engine, a hybrid vehicle having both an internal combustion engine and an electric driving apparatus, and an electric vehicle having only an electric driving apparatus, and may include not only an automobile but also a train and a motorcycle. At this time, the autonomous vehicle may be regarded as a robot having an autonomous driving function.

The robot of an embodiment may be connected to communicate with the server and other communication devices. The robot may be configured to include at least one of a mobile communication module and a wireless internet module configured to communicate with a server, and the like. In addition, the robot may further include a short-range communication module.

The mobile communication module may transmit and receive wireless signals to and from at least one of a base station, an external terminal, and a server on a mobile communication network established according to technical standards or communication methods for mobile communications, for example, global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), 5 generation (5G) communication and the like.

The wireless Internet module refers to a module for wireless Internet access. The wireless Internet module may be provided in the robot. The wireless internet module may transmit and receive wireless signals via a communication network according to wireless internet technologies.

The robot may transmit/receive data to/from a server and various terminals that may perform communication through a 5G network. In particular, the robot may perform data communication with a server and a terminal using at least one service of eMBB (enhanced mobile broadband), URLLC (ultra-reliable and low latency communications), and mMTC (massive machine-type communications) through a 5G network.

The enhanced mobile broadband (eMBB) which is a mobile broadband service provides multimedia contents, wireless data access, and so forth. In addition, more improved mobile services such as a hotspot and a wideband coverage for receiving mobile traffic that are tremendously increasing may be provided through eMBB. Through a hotspot, the large-volume traffic may be accommodated in an area where user mobility is low and user density is high. Through broadband coverage, a wide-range and stable wireless environment and user mobility may be guaranteed.

The URLLC service defines the requirements that are far more stringent than existing LTE in terms of reliability and transmission delay of data transmission and reception, and corresponds to a 5G service for production process automation in the industrial field, telemedicine, remote surgery, transportation, safety, and the like.

mMTC is a transmission delay-insensitive service that requires a relatively small amount of data transmission. A much larger number of terminals, such as sensors, than a general portable phone may be connected to a wireless access network by mMTC at the same time. In this case, the price of the communication module of a terminal should be low and a technology improved to increase power efficiency and save power is required to enable operation for several years without replacing or recharging a battery.

An artificial intelligence technology may be applied to the robot. Artificial intelligence refers to a field of studying artificial intelligence or a methodology for creating the same. Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different floors, a learning process for updating a model parameter, and an activation function for generating an output value.

The ANN may include an input floor, an output floor, and may selectively include one or more hidden floors. Each floor includes one or more neurons, and the artificial neural network may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, a hyperparameter refers to a parameter which is set before learning in a machine learning algorithm, and includes a learning rate, a number of repetitions, a mini batch size, an initialization function, and the like.

The objective of training an ANN is to determine a model parameter for significantly reducing a loss function. The loss function may be used as an indicator for determining an optimal model parameter in a learning process of an artificial neural network.

The machine learning may be classified into supervised learning, unsupervised learning, and reinforcement learning depending on the learning method.

Supervised learning may refer to a method for training an artificial neural network with training data that has been given a label. In addition, the label may refer to a target answer (or a result value) to be guessed by the artificial neural network when the training data is inputted to the artificial neural network.

The Supervised Learning is a method of the Machine Learning for inferring one function from the training data.

Among the functions that may be thus derived, a function that outputs a continuous range of values may be referred to as a regressor, and a function that predicts and outputs the class of an input vector may be referred to as a classifier.

In the Supervised Learning, the Artificial Neural Network is learned in a state where a label for the training data has been given.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

In the meantime, the training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning may refer to a method for training an artificial neural network using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden floors may be referred to as deep learning, and the deep learning is one machine learning technique.

FIG. 1A shows a state where a loading box 100 has been closed, and FIG. 1B shows a state where a first floor 100-1 of the loading box 100 has been opened to withdraw or load goods. In FIG. 1B, the arrows indicate that a third floor 100-3 of the loading box 100, the center of gravity (COG) of the robot, and an auxiliary wheel 300 has moved in the first direction, in the direction away from the robot, respectively.

The robot may include the loading box 100, a drive wheel 200, the auxiliary wheel 300, a variable supporter 400, and a support wheel 500.

The loading box 100 may be provided to load the goods, and to be movable at a certain distance with respect to the robot when closed and opened. That is, the loading box 100 may be closed or opened to load the goods or to withdraw the loaded goods, as illustrated in FIGS. 1A and 1B, and when closed or opened, the loading box 100 may move a certain distance in the first direction, that is, the y-axis direction.

The loading box 100 may be provided in a single floor, or may be provided in a plurality of floors. For example, the loading box 100 may be provided as a first floor 100-1, a second floor 100-2, and a third floor 100-3. However, the loading box 100 may also be provided as a single floor, two floors, or four or more floors. Each floor of the loading box 100 may move in the first direction independently of each other, and each floor may load the goods independently.

Each floor of the loading box 100 is provided in a sliding type that may move a certain distance in the first direction, and when each floor is moved in the direction closer to the robot, each floor is closed, and when each floor is moved away from the robot, each floor may be open.

The first direction movement of each floor may be controlled by a controller provided in the robot. For example, FIG. 1A illustrates a state where the third floor 100-3 has been closed in a state where the goods has been loaded in the third floor 100-3, and FIG. 1B illustrates a state where the third floor 100-3 has moved in the direction away from the robot along the first direction to be opened in order to withdraw the goods in the state of FIG. 1A.

The drive wheel 200 may be located at a position where the robot and the ground surface contact each other, and may drive the robot. The controller may drive the robot by controlling the operation of the drive wheel 200. The drive wheel 200 may be provided in a pair, and control the rotational speed of each drive wheel 200 to control the operation necessary for driving the robot, such as rotation, straight, or change in the driving direction.

The auxiliary wheel 300 may be provided at a position spaced apart from the drive wheel 200 at a position where the robot and the ground surface contact each other, and may support the robot so that the robot does not overturn.

The support wheel 500 may be located so as to be spaced apart from the drive wheel 200 and the auxiliary wheel 300 at a position where the robot and the ground surface contact each other, and may support the robot so that the robot does not overturn, together with the auxiliary wheel 300.

The auxiliary wheel 300 and the support wheel 500 may be provided, for example, in the form of a caster capable of rotating 360° on the x-y plane substantially parallel to the ground surface.

The variable supporter 400 may change the position of the auxiliary wheel 300. That is, the variable supporter 400 may change the position of the first direction of the auxiliary wheel 300 in the robot by moving the auxiliary wheel 300 in the first direction within a certain range.

At this time, the auxiliary wheel 300 may be coupled to the variable supporter 400, and accordingly, the variable supporter 400 may support the loading box 100 together with the auxiliary wheel 300.

The variable supporter 400 may move the auxiliary wheel 300 so as to correspond to the movement direction of the center of gravity (COG) of the robot. At this time, the center of gravity (COG) of the robot may mean the entire center of gravity (COG) in the state where the goods has been loaded on the robot.

Referring to FIG. 1, the position of the center of gravity (COG) in the state where the goods have been loaded in the third floor 100-3 of the loading box 100 and the third floor 100-3 has been closed is as illustrated in FIG. 1A. Meanwhile, the position of the center of gravity (COG) in the state where the goods have been loaded in the third floor 100-3 of the loading box 100, and the third floor 100-3 has been moved in the first direction in order to withdraw the goods is as illustrated in FIG. 1B.

Referring to FIG. 1B, when the third floor 100-3 moves in the direction away from the robot along the first direction, that is, in the outside direction of the robot, the center of gravity of the robot may also move in the outside of the robot equally.

Hereinafter, for clarity, the direction away from the robot along the first direction may be expressed as the outside direction of the robot, and the side away from the robot along the first direction may be expressed as the outside.

When the center of gravity (COG) of the robot moves in the outside direction of the robot and is located outside the robot more than the contact point (CP, see FIGS. 5 and 6) of the auxiliary wheel 300 and the ground surface, a moment due to the weight and structure of the robot acts, and the robot is likely to overturn due to this moment. The action of the moment will be described in detail with reference to the drawings below.

Accordingly, in order to suppress the overturning of the robot, as illustrated in FIG. 1B, the auxiliary wheel 300 moves in the outside direction of the robot, such that the contact point (CP) may be located at the same position as the center of gravity (COG) of the robot in the z-axis direction, or outside the center of gravity (COG) of the robot.

When the contact point (CP) is located at the same position as the center of gravity of the robot or outside the center of gravity of the robot, the moment may not act or the action direction of the moment may change, such that the moment may eliminate the risk of the robot overturning. The action of the moment will be described in detail with reference to the drawings below.

Each floor of the loading box 100 may be provided with a pressure sensor configured to measure the weight distribution of the goods loaded in the loading box 100. The pressure sensor may measure the weight distribution according to the shape of the goods loaded on each floor, the position placed on each floor, and the like.

Figure 2:
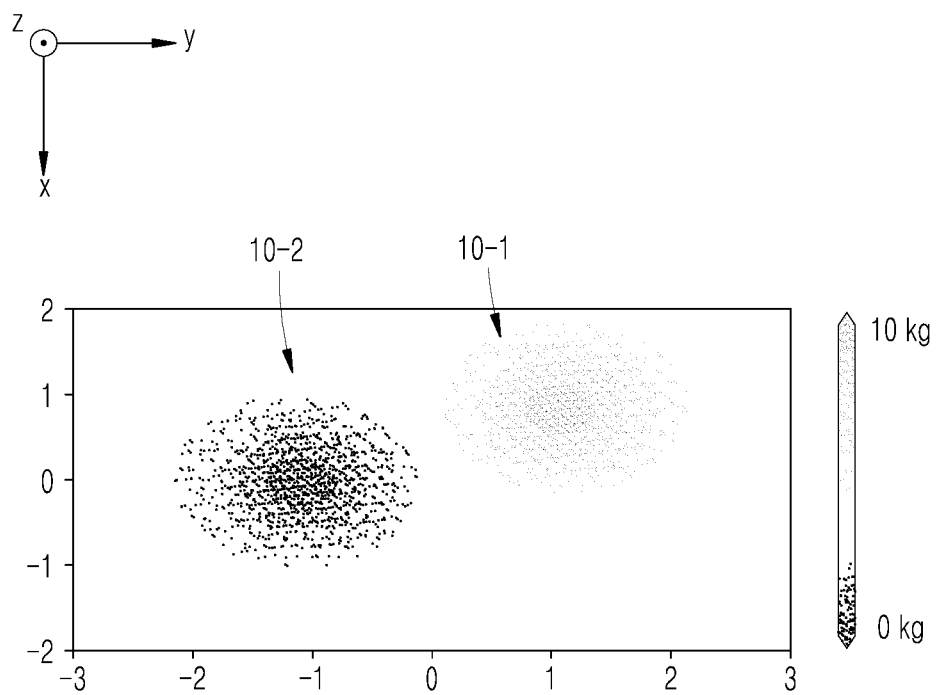
FIG. 2 is a diagram for explaining the weight distribution of the goods loaded in a loading box according to an embodiment.

FIG. 2 is a diagram for explaining the weight distribution of the goods loaded in the loading box 100 according to an embodiment. For example, the goods have been loaded on the third floor 100-3, and the loaded goods may be a rugby ball shaped first goods 10-1 and a donut shaped second goods 10-2.

The pressure sensor may measure a position where the first goods 10-1 and the second goods 10-2 are placed on the x-y plane, and the controller of the robot may obtain their numerical value. In addition, the pressure sensor may measure the weight distribution of each of the first goods 10-1 and the second goods 10-2, and the controller may obtain its numerical value.

Accordingly, the controller of the robot may receive the measured value from the pressure sensor to obtain information on the weight distribution of the entire goods of the third floor 100-3 of a graph as illustrated in FIG. 2.

Figure 3:
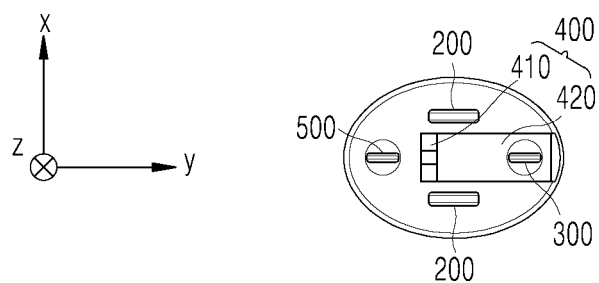
FIG. 3 is a bottom diagram of a robot according to an embodiment.
Figure 4:
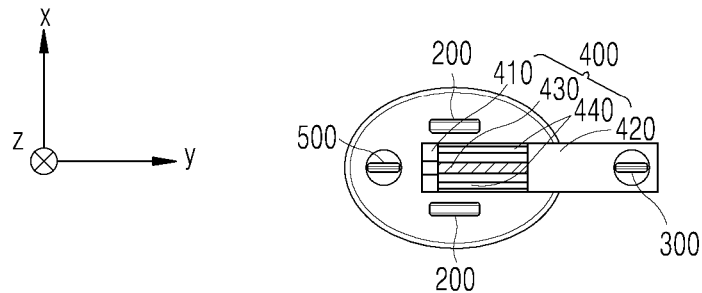
FIG. 4 is a diagram illustrating a state where a variable supporter has been unfolded in FIG. 3.

FIG. 3 is a bottom diagram of a robot according to an embodiment. FIG. 4 is a diagram illustrating a state where the variable supporter 400 has been unfolded in FIG. 3. The variable supporter 400 may include a motor 410, a linear mover 420, a guider 430, and a screw 440.

The motor 410 may rotate to linearly move, that is, linearly reciprocate the linear mover 420. Of course, the operation of the motor 410 may be controlled by the controller provided in the robot.

The linear mover 420 may be mounted with the auxiliary wheel 300, and may move linearly according to the rotation of the motor 410. The rotation direction of the motor 410 is changed, such that the linear mover 420 may move in the outside direction of the robot or the opposite direction thereof.

The guider 430 may have one side fixed to the motor 410, and have the other side coupled to the linear mover 420 so that the linear mover 420 is movable. The guider 430 may be located so that its longitudinal direction is parallel to the first direction to guide so that the linear mover 420 moves linearly in the first direction.

The screw 440 may have one side coupled to the rotary shaft of the motor 410 to rotate according to the rotation of the motor 410 and have the other side coupled to the linear mover 420 so that the linear mover 420 is movable.

The screw 440 is located so that its longitudinal direction is parallel to the first direction, and accordingly, when the motor 410 rotates, the linear mover 420 may linearly move in the longitudinal direction of the screw 440. Due to this structure, the screw 440 may convert the rotational motion of the motor 410 into the linear motion of the linear mover 420.

According to the above-described structure, the controller of the robot may control the operation time and the rotation direction of the motor 410 to control the movement direction and the movement distance in the first direction of the variable supporter 400 and the auxiliary wheel 300 mounted thereto.

Figure 5:
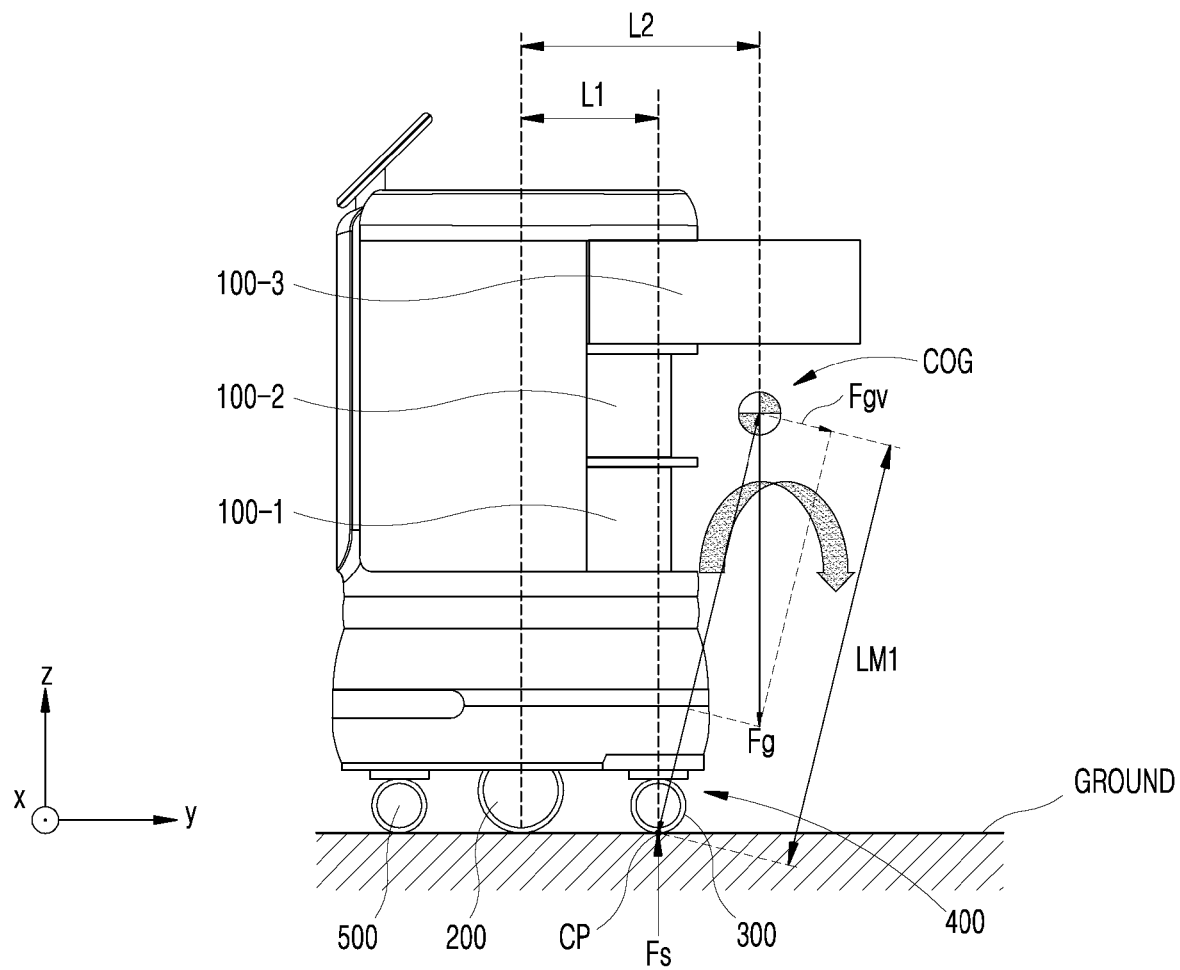
FIGS. 5 and 6 are diagrams for explaining an operation of a moment according to the position of an auxiliary wheel.
Figure 6:
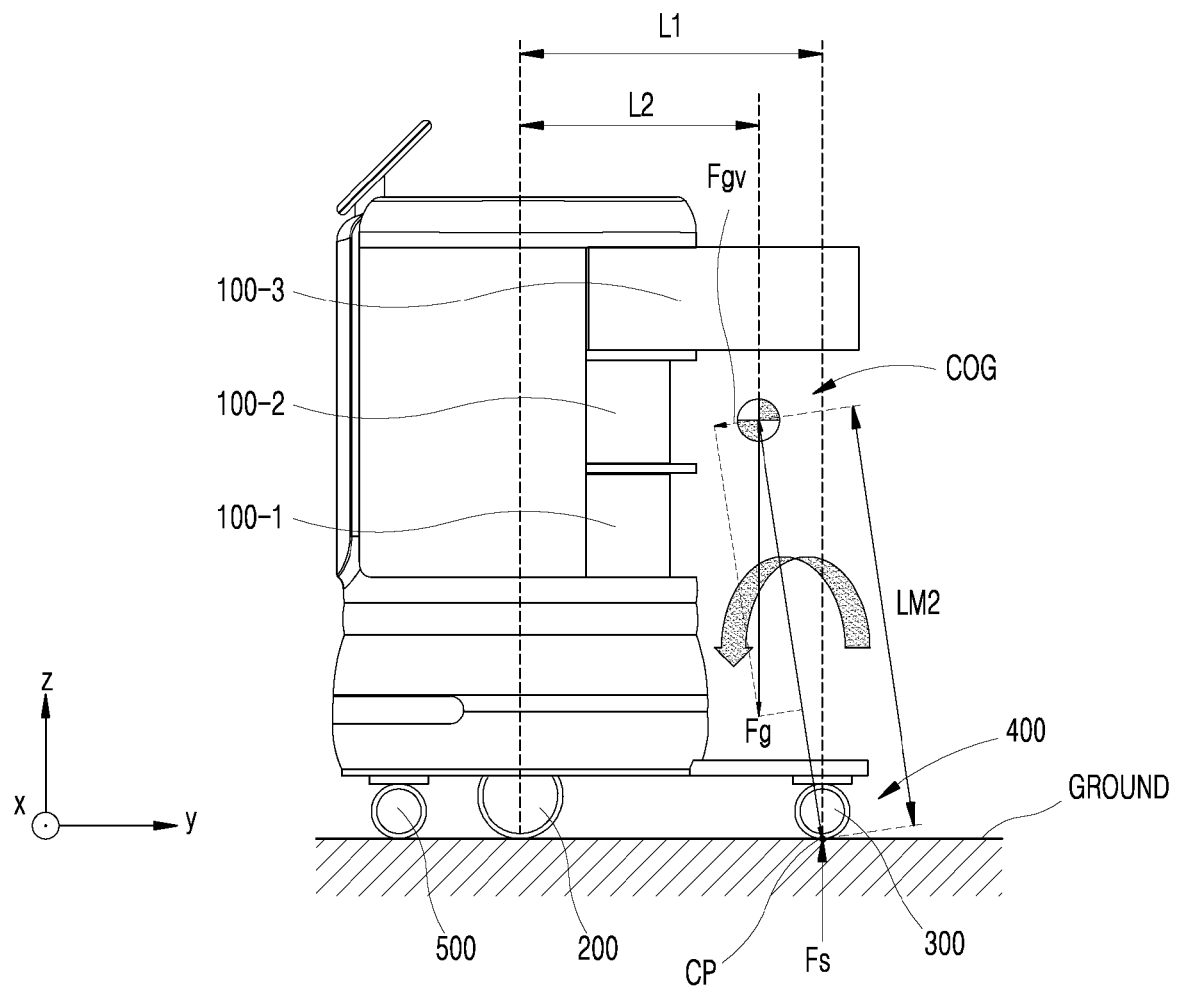

FIGS. 5 and 6 are diagrams for explaining the action of the moment according to the position of the auxiliary wheel 300. In FIGS. 5 and 6, the position of the center of gravity (COG) has been illustrated in the state where the third floor 100-3 has been open. When the third floor 100-3 has been open, the center of gravity (COG) may move in the outside direction of the robot compared to the state where the third floor 100-3 has been closed.

The variable supporter 400 may move the auxiliary wheel 300 in the first direction so that a first length (L1) measured from the drive wheel 200 to the auxiliary wheel 300 in the first direction is equal to or longer than a second length (L2) measured from the drive wheel 200 to the center of gravity (COG) of the robot in the first direction.

FIG. 5 is a diagram illustrating a case where the first length (L1) is shorter than the second length (L2). Hereinafter, the action of the moment due to the weight of the robot in the state illustrated in FIG. 5 will be described.

The center of gravity (COG) of the robot is in the position illustrated, and the weight of the robot is gravity (Fg). The gravity (Fg) acts in the direction perpendicular to the ground surface at the center of gravity (COG). At the contact point (CP) where the auxiliary wheel 300 of the robot contacts the ground surface, a reaction force (Fs) is generated in the direction opposite to the gravity (Fg). At this time, a straight line connecting the contact point (CP) and the center of gravity (COG) is referred to as a moment arm.

The magnitude (M1) of the moment acting on the robot around the contact point (CP) is the product of a distance (LM1) of the moment arm and the component force of the gravity (Fgv) acting in the direction perpendicular to the moment arm.

$$M1=LM1 \times Fgv$$

Meanwhile, the action direction of the moment acts clockwise as viewed from the paper around the contact point (CP) in FIG. 5. That is, the moment acts in the direction indicated by the semi-circular arrow in FIG. 5.

As the moment acts clockwise as viewed from the paper, the robot may overturn due to the action of the moment. This is because there is no means configured to support the robot even though the robot may turn clockwise as viewed from the paper due to the action of the position of the center of gravity of the robot (COG) and the action of the moment.

As may be seen in the above description with reference to FIG. 5, when the first length (L1) is shorter than the second length (L2), the robot may overturn due to the action of the moment.

FIG. 6 is a diagram illustrating a case where the first length (L1) is longer than the second length (L2) according to an embodiment. FIG. 6 is a state where the auxiliary wheel 300 has moved in the outside direction of the robot along the first direction as compared with FIG. 5. Hereinafter, the action of the moment due to the weight of the robot in the state illustrated in FIG. 6 will be described.

The center of gravity (COG) of the robot is in the position illustrated, and the weight of the robot is gravity (Fg). The gravity (Fg) acts in the direction perpendicular to the ground surface at the center of gravity (COG). The reaction force (Fs) is generated in the opposite direction to the gravity (Fg) at the contact point (CP) where the auxiliary wheel 300 of the robot contacts the ground surface (GROUND).

The magnitude (M2) of the moment acting on the robot around the contact point (CP) is the product of a distance (LM2) of the moment arm and the component force of the gravity (Fgv) acting in the direction perpendicular to the moment arm.

$$M2=LM2 \times Fgv$$

Meanwhile, the action direction of the moment acts counterclockwise as viewed from the paper around the contact point (CP) in FIG. 6. That is, the moment acts in the direction indicated by the semi-circular arrow in FIG. 6.

As the moment acts counterclockwise as viewed from the paper, the risk of overturning the robot due to the action of the moment may be solved. This means that even if the moment acts counterclockwise when the robot is viewed from the paper due to the position of the center of gravity (COG) of the robot and the action of the moment, the drive wheel 200 and the auxiliary wheel 300 may support the robot so as not to overturn.

As may be seen from the above description with reference to FIG. 6, when the first length (L1) is longer than the second length (L2), the robot does not overturn due to the action of the moment.

Meanwhile, when the first length (L1) and the second length (L2) are the same, the moment due to the gravity (Fg) does not occur around the contact point (CP), and accordingly, the risk of overturning the robot due to the action of the moment does not occur.

Accordingly, in order to prevent the robot from overturning due to the moment, an embodiment may move the auxiliary wheel 300 in the first direction so that the first length (L1) is equal to or longer than the second length (L2).

For stable support of the robot, it may be more appropriate to move the auxiliary wheel 300 so that the first length (L1) is longer than the second length (L2). The difference between the first length (L1) and the second length (L2) may be appropriately set considering the stable support of the robot.

In an embodiment, the auxiliary wheel 300 of the robot is moved in the outside direction of the robot to stably support the robot, and accordingly, it is possible to effectively suppress the overturning of the robot due to the movement of the center of gravity (COG) even if the loading box 100 of the robot is opened and the center of gravity (COG) of the robot loaded with the goods moves.

Hereinafter, a method for estimating the position of the center of gravity (COG) of the robot will be described in detail. The robot may estimate the position of the center of gravity (COG) of the robot based on the weight distribution of the goods measured from the pressure sensor and the structure of the robot.

The robot may hold the center of gravity (COG) data, which is information on the position of the center of gravity (COG) of the robot according to the weight distribution of the goods and the movement of the loading box 100. The information on the position of the center of gravity (COG) of the robot may be numerically coordinated (x, y, z), and at this time, the origin (0, 0, 0) of the coordinate may be appropriately set to a specific point of the robot.

The center of gravity (COG) data may hold an input value relating to the structure of the robot considering the weight distribution of the goods and the movement position of the loading box 100, and coordinates indicating the position of the center of gravity (COG) of the robot that is an output value corresponding to these input values.

At this time, as the input value is changed, the position of the center of gravity (COG) of the robot may vary. Accordingly, the input value may be to specify the position of the center of gravity (COG) of the robot.

Specifically, the center of gravity (COG) data may hold information on the position of the center of gravity (COG) of the robot according to the weight distribution of the goods loaded in the loading box 100, the floor number loaded with the goods in the loading box 100, the movement distance of the loading box 100 when the loading box 100 is open, and the number of floors of the loading box 100.

At this time, the center of gravity (COG) data may hold, as an input value, the weight distribution of the goods loaded in the loading box 100, the floor number of the goods loaded in the loading box 100, the movement distance of the loading box when the loading box 100 is open, and a numerical value on the number of floors of the loading box 100. In addition, the center of gravity (COG) data may hold a coordinate value on the position of the center of gravity (COG) of the robot as an output value.

The robot may adjust the first length (L1) measured from the drive wheel 200 of the variable supporter 400 to the auxiliary wheel 300 in the first direction based on the center of gravity (COG) data. The method for adjusting the first length (L1) is as described above.

That is, when receiving the input value, the controller of the robot may find a coordinate value of the position of the center of gravity (COG) corresponding to the input value from the center of gravity (COG) data, and the first length (L1) according to the found coordinate value.

The center of gravity (COG) data may be derived by machine learning. The machine learning may be performed by using an AI apparatus 1000, an AI server 2000, and an AI system 1 that are connected to communicate with the robot.

The variable supporter 400 may adjust the movement speed of the auxiliary wheel 300 so as to correspond to the movement speed of the center of gravity (COG) of the robot. For example, the controller of the robot may confirm the position change of the center of gravity (COG) according to the change in time and derive the movement speed of the center of gravity (COG) of the robot therefrom.

The controller may control the operation of the variable supporter 400 so as to correspond to the movement speed of the center of gravity (COG) of the robot, such that the variable supporter 400 may adjust the movement speed of the auxiliary wheel 300.

The movement speed of the center of gravity (COG) may also vary in proportion to the movement speed of the loading box 100. As a result, the robot may adjust the movement speed of the auxiliary wheel 300 so as to correspond to the movement speed of the loading box 100.

It is possible to prevent the auxiliary wheel 300 from moving too fast so that the auxiliary wheel 300 may stably support the robot, thereby suppressing the overturning of the robot.

The robot may further include a sensing sensor configured to detect an external obstacle. The sensor may be provided with a lidar, a radar, a 3D camera, an RGB-D camera, an ultrasonic sensor, an infrared sensor, a laser sensor, or the like.

The variable supporter 400 may adjust the movement distance of the auxiliary wheel 300 so that the obstacle sensed by the sensor is spaced at a certain distance apart from the auxiliary wheel 300.

When finding an obstacle adjacent to the outside of the robot through the sensing sensor, the controller of the robot may control the operation of the variable supporter 400 so that the auxiliary wheel 300 and the obstacle are spaced at a certain distance apart from each other.

This is to prevent breakage of the auxiliary wheel 300 due to the contact between the obstacle and the auxiliary wheel 300 and the overturning of the robot.

Hereinafter, the AI apparatus 1000, the AI server 2000, and the AI system 1 related to an embodiment will be described.

Figure 7:
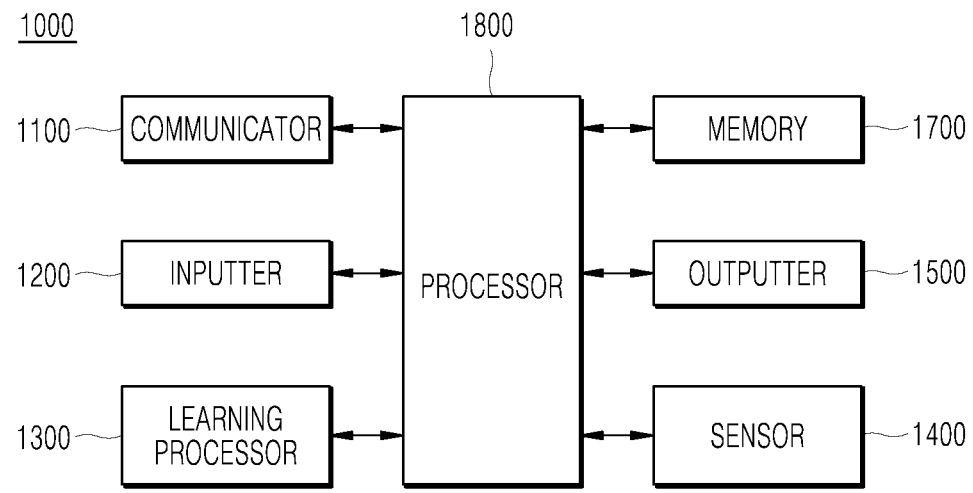
FIG. 7 is a diagram illustrating an AI apparatus according to an embodiment.

FIG. 7 is a diagram illustrating the AI apparatus 1000 according to an embodiment.

The AI apparatus 1000 is a TV, a projector, a mobile phone, a smartphone, a desktop computer, a notebook, a digital broadcasting terminal, a personal digital assistants (PDA), a portable multimedia player (PMP), a navigation device, a tablet PC, a wearable device, and a set-top box (STB), a DMB receiver, a radio, a washing machine, a refrigerator, a desktop computer, a digital signage, a robot, a vehicle, or the like.

Referring to FIG. 7, the AI apparatus 1000 may include a communicator 1100, an inputter 1200, a learning processor 1300, a sensor 1400, an outputter 1500, a memory 1700, a processor 1800, and the like.

The communicator 1100 may transmit and receive data to and from external devices such as the other AI apparatuses 1000a to 1000e or the AI server 2000 by using a wired or wireless communication technology. For example, the communicator 1100 may transmit and receive sensor information, a user input, a learning model, a control signal, and the like with external devices.

In this case, the communications technology used by the communications unit 1100 may be technology such as global system for mobile communication (GSM), code division multi access (CDMA), long term evolution (LTE), 5G, wireless LAN (WLAN), Wireless-Fidelity (Wi-Fi), Bluetooth™, radio frequency identification (RFID), infrared data association (IrDA), ZigBee, and near field communication (NFC).

The inputter 1200 may obtain various types of data.

The inputter 1200 may include a camera for inputting an image signal, a microphone for receiving an audio signal, and a user inputter for receiving information inputted from a user. Here, the signal obtained from the camera or the microphone may also be referred to as sensing data or sensor information by regarding the camera or the microphone as a sensor.

The inputter 1200 may obtain, for example, learning data for model learning and input data used when output is obtained using a learning model. The inputter 1200 may obtain raw input data. In this case, the processor 1800 or the learning processor 1300 may extract an input feature by preprocessing the input data.

The learning processor 1300 may allow a model, composed of an artificial neural network to be trained using learning data. Here, the trained artificial neural network may be referred to as a trained model. The trained model may be used to infer a result value with respect to new input data rather than learning data, and the inferred value may be used as a basis for a determination to perform an operation of classifying the detected hand motion.

The learning processor 1300 may perform AI processing together with a learning processor 2400 of the AI server 2000.

The learning processor 1300 may include a memory which is combined or implemented in the AI apparatus 1000. Alternatively, the learning processor 1300 may be implemented using the memory 1700, an external memory directly coupled to the AI apparatus 1000, or a memory maintained in an external device.

The sensor 1400 may obtain at least one of internal information of the AI apparatus 1000, surrounding environment information of the AI apparatus 1000, or user information by using various sensors.

The sensor 1400 may include a proximity sensor, an illumination sensor, an acceleration sensor, a magnetic sensor, a gyroscope sensor, an inertial sensor, an RGB sensor, an infrared (IR) sensor, a finger scan sensor, an ultrasonic sensor, an optical sensor, a microphone, a light detection and ranging (LiDAR) sensor, radar, or a combination thereof.

The outputter 1500 may generate a visual, auditory, or tactile related output.

The outputter 1500 may include a display unit outputting visual information, a speaker outputting auditory information, and a haptic module outputting tactile information.

The memory 1700 may store data supporting various functions of the AI apparatus 1000. For example, the memory 1700 may store input data, training data, training model, training history, and the like obtained from the input unit 1200.

The processor 1800 may determine at least one executable operation of the AI apparatus 1000 based on information determined or generated by using a data analysis algorithm or a machine learning algorithm. In addition, the processor 1800 may control components of the AI apparatus 1000 to perform the determined operation.

To this end, the processor 1800 may request, retrieve, receive, or use data of the learning processor 1300 or the memory 1700, and may control components of the apparatus 1000 to execute a predicted operation or an operation determined to be preferable of the at least one executable operation.

At this time, when the external device needs to be linked to perform the determined operation, the processor 1800 may generate a control signal for controlling the corresponding external device, and transmit the generated control signal to the corresponding external device.

The processor 1800 obtains intent information about user input, and may determine a requirement of a user based on the obtained intent information.

The processor 1800 may obtain intent information corresponding to user input by using at least one of a speech to text (operation STT) engine for converting voice input into a character string or a natural language processing (NLP) engine for obtaining intent information of a natural language.

In an embodiment, the at least one of the STT engine or the NLP engine may be composed of artificial neural networks, some of which are trained according to a machine learning algorithm. In addition, the at least one of the STT engine or the NLP engine may be trained by the learning processor 1300, trained by a learning processor 2400 of an AI server 2000, or trained by distributed processing thereof.

The processor 1800 collects history information including, for example, operation contents and user feedback on an operation of the AI apparatus 1000, and stores the history information in the memory 1700 or the learning processor 1300, or transmits the history information to an external device such as an AI server 2000. The collected history information may be used to update a learning model.

The processor 1800 may control at least some of components of the AI apparatus 1000 to drive an application stored in the memory 1700. Furthermore, the processor 1800 may operate two or more components included in the AI apparatus 1000 in combination with each other to drive the application.

Figure 8:
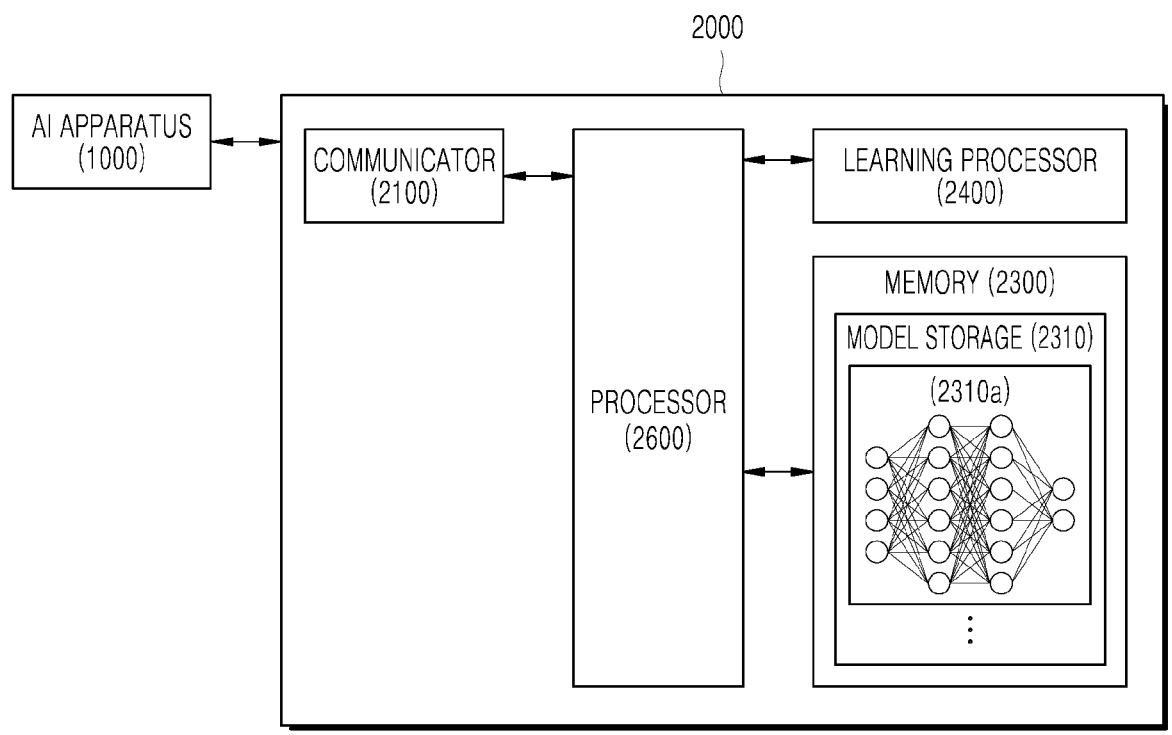
FIG. 8 is a diagram illustrating an AI server according to an embodiment.

FIG. 8 is a diagram illustrating the AI server 2000 according to an embodiment.

Referring to FIG. 8, the AI server 2000 may refer to a device for training an artificial neural network using a machine learning algorithm or using a trained artificial neural network. Here, the AI server 2000 may include a plurality of servers to perform distributed processing, and may be defined as a 5G network. In this case, the AI server 2000 may be included as a configuration of a portion of the AI apparatus 1000, and may thus perform at least a portion of the AI processing together.

The AI apparatus 1000 means an apparatus that may perform machine learning.

The AI apparatus 1000 is a TV, a projector, a mobile phone, a smartphone, a desktop computer, a notebook, a digital broadcasting terminal, a personal digital assistants (PDA), a portable multimedia player (PMP), a navigation device, a tablet PC, a wearable device, and a set-top box (STB), a DMB receiver, a radio, a washing machine, a refrigerator, a desktop computer, a digital signage, a robot, a vehicle, or the like.

The AI server 2000 may include a communications unit 2100, a memory 2300, a learning processor 2400, and a processor 2600.

The communications unit 2100 may transmit and receive data with an external device such as the AI apparatus 1000.

The memory 2300 may include a model storage 2310. The model storage 2310 may store a model (or an artificial neural network 231*a*) learning or learned via the learning processor 2400.

The learning processor 2400 may train the artificial neural network 2310*a* by using learning data. The learning model may be used while mounted in the AI server 2000 of the artificial neural network, or may be used while mounted in an external device such as the AI apparatus 1000.

The learning model may be implemented as hardware, software, or a combination of hardware and software. When a portion or the entirety of the learning model is implemented as software, one or more instructions, which constitute the learning model, may be stored in the memory 2300.

The processor 2600 may infer a result value with respect to new input data by using the learning model, and generate a response or control command based on the inferred result value.

Figure 9:
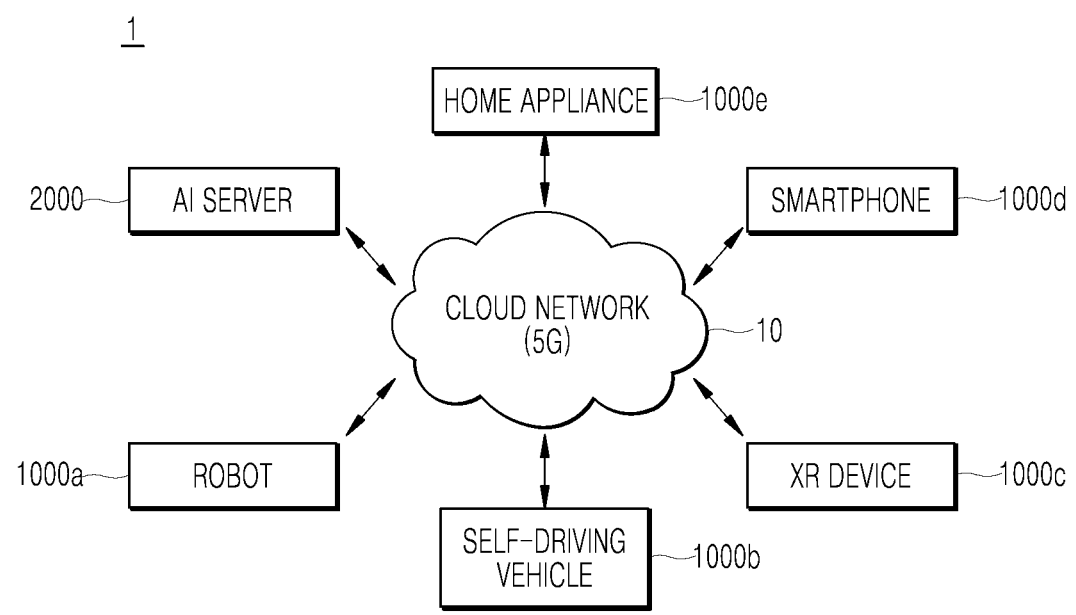
FIG. 9 is a diagram illustrating an AI system according to an embodiment.

FIG. 9 is a diagram illustrating the AI system 1 according to an embodiment.

Referring to FIG. 9, in the AI system 1, at least one or more of AI server 2000, robot 1000*a*, autonomous vehicle 1000*b*, XR apparatus 1000*c*, smartphone 1000*d*, or home appliance 1000*e* are connected to a cloud network 10. Here, the robot 1000*a*, the self-driving vehicle 1000*b*, the XR apparatus 1000*c*, the smartphone 1000*d*, or the home appliance 1000*e*, to which AI technology is applied, may be referred to as AI apparatuses 1000*a* to 1000*e*.

The cloud network 10 may include part of the cloud computing infrastructure or refer to a network existing in the cloud computing infrastructure. Here, the cloud network 10 may be constructed by using the 3G network, 4G or Long Term Evolution (LTE) network, or a 5G network.

In other words, individual devices (1000*a* to 1000*e*, 2000) constituting the AI system 1 may be connected to each other through the cloud network 10. In particular, each individual device (1000*a* to 1000*e*, 2000) may communicate with each other through the base station but may communicate directly to each other without relying on the base station.

The AI server 2000 may include a server performing AI processing and a server performing computations on big data.

The AI server 2000 may be connected to at least one or more of the robot 1000*a*, autonomous vehicle 1000*b*, XR apparatus 1000*c*, smartphone 1000*d*, or home appliance 1000*e*, which are AI apparatuses constituting the AI system, through the cloud network 10 and may help at least part of AI processing conducted in the connected AI apparatuses (1000*a* to 1000*e*).

At this time, the AI server 0200 may train the AI network according to the machine learning algorithm instead of the AI apparatuses 1000*a* to 1000*e*, and may directly store the learning model or transmit the learning model to the AI apparatuses 1000*a* to 1000*e*.

At this time, the AI server 2000 may receive input data from the AI apparatus 1000*a* to 1000*e*, infer a result value from the received input data by using the learning model, generate a response or control command based on the inferred result value, and transmit the generated response or control command to the AI apparatus 1000*a* to 1000*e*.

Similarly, the AI apparatus 1000*a* to 1000*e* may infer a result value from the input data by employing the learning model directly and generate a response or control command based on the inferred result value.

The center of gravity (COG) data may be derived, for example, by supervised learning in the method of machine learning.

The supervised learning may be, for example, performed in such a manner that the training data infers labeling data that is a pre-derived result value of the center of gravity (COG) data.

The center of gravity (COG) data has an input value and an output value corresponding thereto. The output value may be a position coordinate of the center of gravity (COG) of the robot. The input value is a variable specifying the output value and may be plural.

The input value is, for example, the weight distribution of the goods loaded in the loading box 100, the floor number on which the goods have been loaded in the loading box 100, the movement distance of the loading box 100 when the loading box 100 has been open, and the number of floors of the loading box 100.

The training data has any input value. The labeling data is the derived result value of the center of gravity (COG) data, which is the correct answer that the artificial neural network should infer in the supervised learning.

The supervised learning may be to derive the functional relationship between a position of the center of gravity (COG) of the robot, that is, a position coordinate of the center of gravity (COG) of the robot, and an input value specifying the position of the center of gravity (COG).

The artificial neural network may select the position coordinate of the center of gravity (COG) of the gravity that is an output value with respect to any input value, and select a function of connecting the input value and the output value.

The artificial neural network may perform a comparison task of the labeling data with the same input value. The artificial neural network may modify the function so that each output value is the same when the selected output value and the output value of the labeling data are different from each other.

The artificial neural network may repeat the above task to derive a function of connecting any input value and the output value. Accordingly, the center of gravity (COG) data may hold a function derived from the supervised learning, and the position coordinate of the center of gravity (COG) of the robot for any input value derived by using the function.

The following relationship is established between the position coordinate (x, y, z) of the center of gravity (COG) of the robot, which is the output value derived from supervised learning, and the function (f) derived by the artificial neural network.

$$COG(x,y,z)=f(l,p_{dist},m,n)$$

Where, l: floor number in which the goods have been loaded in the loading box 100

$p_{dist}$: weight distribution of the goods loaded in the loading box 100 m: movement distance of the loading box 100 when the loading box 100 is open n: number of floors of the loading box 100

However, the input value is not limited thereto, and more various variables may be used as the input value.

Meanwhile, the m and n values may be constant values that do not change in the same robot. Accordingly, the m and n values may be replaced with a parameter function (θ) whose value is changed when it is different robots. That is, the parameter function (θ) may be expressed as a function (g) for m and n as follows.

$$\theta=g(m,n)$$

Of course, the function (g) may also be derived by the supervised learning.

Accordingly, the position coordinate of the center of gravity (COG) of the robot may be expressed as follows.

$$COG(x,y,z)=h(l,p_{dist},\theta)$$

here, $$f(l,p_{dist},m,n)=h(l,p_{dist},\theta)$$

The center of gravity (COG) data derived from the supervised learning may have the above-described function relating to the input value and the output value. Accordingly, the position coordinate of the center of gravity (COG) of the robot, which is an output value, may be found from the center of gravity (COG) data for any input value.

The labeling data may be derived, for example, by using a program that finds the center of gravity (COG) from the shape of the object. That is, such a program may output the center of gravity (COG) of the object when the shape of the object is input.

Accordingly, when the specific shape of the robot and the shape of the goods loaded on the robot are input to the program, the center of gravity (COG) of the robot loaded with the goods may be found. Of course, the center of gravity (COG) of the entire robot at each position in the x-direction of the loading box 100 may also be found when the loading box 100 loaded with the goods has moved in the x direction due to the opening or closing.

The labeling data derived by using the program may have some limitations in finding the position of the center of gravity (COG) corresponding to all situations. This is because the inputting the shape is a very time consuming task.

Accordingly, an embodiment may derive the function by performing the supervised learning by using the labeling data having a relatively small number of cases, and estimate the center of gravity (COG) of the robot in the implementable situation by using the center of gravity (COG) data having the derived function.

The above-described program configured to find the center of gravity (COG) may also be produced by using a commercial program or through programming. The commercial program may be, for example, a program configured to derive the center of gravity of the Auto CAD, which is a commercial program.

Meanwhile, the center of gravity (COG) data may hold information on the position of the center of gravity (COG) of the robot in each condition, in which at least one among a plurality of input values has been learned in different conditions, during machine learning for deriving the center of gravity (COG) data of the robot.

Accordingly, when at least one of the plurality of input values, for example, the weight distribution of the goods loaded in the loading box 100, the floor number on which the goods have been loaded in the loading box 100, the movement distance of the loading box 100 when the loading box 100 is open, and the number of floors of the loading box 100 is different, the position coordinate of the center of gravity (COG), which is the output value, may also vary.

In an embodiment, the position of the center of gravity (COG) of the robot, which changes due to the weight and shape of the goods loaded in the robot, the overall shape of the robot loaded with the goods, the position movement of the loading box 100, and the like, may be effectively derived through machine learning.

It is possible to move the auxiliary wheel 300 in the first direction corresponding to the derived position of the center of gravity (COG) to stably support the robot, thereby effectively suppressing the overturning of the robot due to the change in position of the center of gravity (COG) of the robot.

Figure 10:
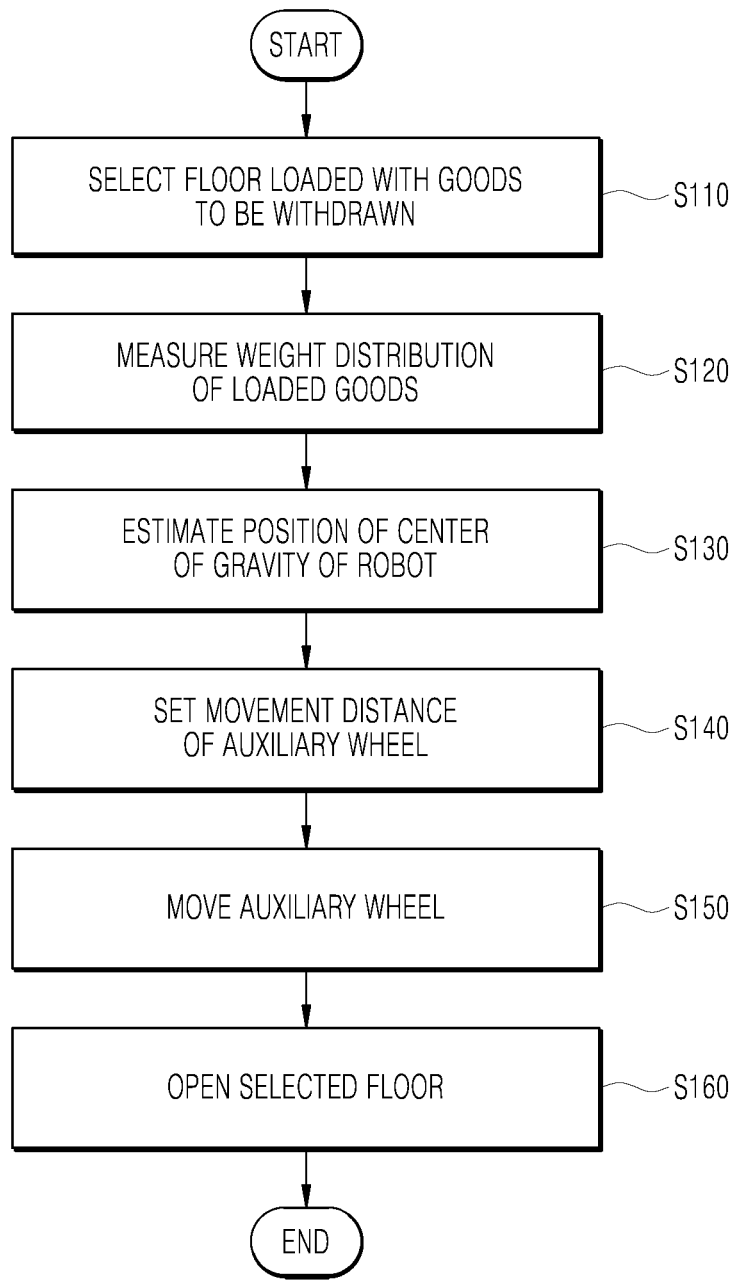
FIG. 10 is a flowchart illustrating an operation method of the robot according to an embodiment.

Hereinafter, an operation method of the robot according to an embodiment will be described. FIG. 10 is a flowchart illustrating an operation method of a robot according to an embodiment. FIG. 10 shows an operation method when the robot withdraws the loaded goods.

The robot may select a floor loaded with the goods to be withdrawn from the loading box 100 provided with a plurality of floors (operation S110). The robot arriving at the delivery destination may select a floor of the loading box 100 loaded with the goods to be completed to deliver.

The robot may measure the weight distribution of the goods loaded in the selected floor by using a pressure sensor provided in each floor of the loading box 100 (operation S120).

The robot may estimate the position of the center of gravity (COG) of the robot based on the weight distribution of the goods and the structure of the robot when the selected floor is open (operation S130). The estimation of the position of the center of gravity (COG) of the robot, as described above, may proceed by using the center of gravity (COG) data held by the robot.

The robot may set the movement distance of the auxiliary wheel 300 according to the estimated center of gravity (COG) of the robot (operation S140). As described above, the robot may set the movement distance of the auxiliary wheel 300 in order to move in its outside direction at the position illustrated in FIG. 5 so that the robot does not overturn due to the action of the moment when the selected floor of the loading box 100 is open.

That is, the robot may set the movement distance of the auxiliary wheel 300 so that the first length (L1) is equal to or longer than the second length (L2). Of course, the movement distance of the auxiliary wheel 300 may vary according to the position of the center of gravity (COG) of the robot.

Referring to FIG. 6, the length of the difference (L1−L2) between the first length (L1) and the second length (L2) may be appropriately set.

The length of (L1−L2) may be zero or a positive value. The length of (L1−L2) may be appropriately selected considering the spatial size of the place where the goods is withdrawn, the safety of the user receiving the service of the robot, and the stable support of the robot.

The variable supporter 400 may move the auxiliary wheel 300 by the set movement distance (operation S150). The variable supporter 400 may move the auxiliary wheel 300 so as to correspond to the movement direction of the center of gravity (COG) of the robot.

The variable supporter 400 may move the auxiliary wheel 300 so that the first length (L1) is equal to or longer than the second length (L2). The controller provided in the robot may control the movement of the variable supporter 400 and the movement distance of the auxiliary wheel 300.

After the auxiliary wheel 300 moves by the set movement distance, the robot may open the selected floor (operation S160). After the selected floor has been open, the goods loaded thereon may be withdrawn.

The operation method of the robot in an embodiment may further include loading the goods in the loading box 100. The loading the goods may be performed prior to all the operations illustrated in FIG. 10. That is, the robot may load the goods on the selected floor of each of the loading box 100 and drive to the delivery destination to withdraw the goods at the delivery destination.

In the loading the goods, the variable supporter 400 may move the auxiliary wheel 300 to the maximum distance that the auxiliary wheel 300 may be moved. At this time, the length of (L1−L2) may be maximized.

In the loading the goods, since it is performed in a warehouse having a relatively safe and large space without the user, the user's safety and the spatial constraint may not be a big problem.

Accordingly, in the loading the goods, it may be appropriate to move the auxiliary wheel 300 so that the length of (L1−L2) is maximized in order to support the robot more stably so as not to overturn.

Figure 11:
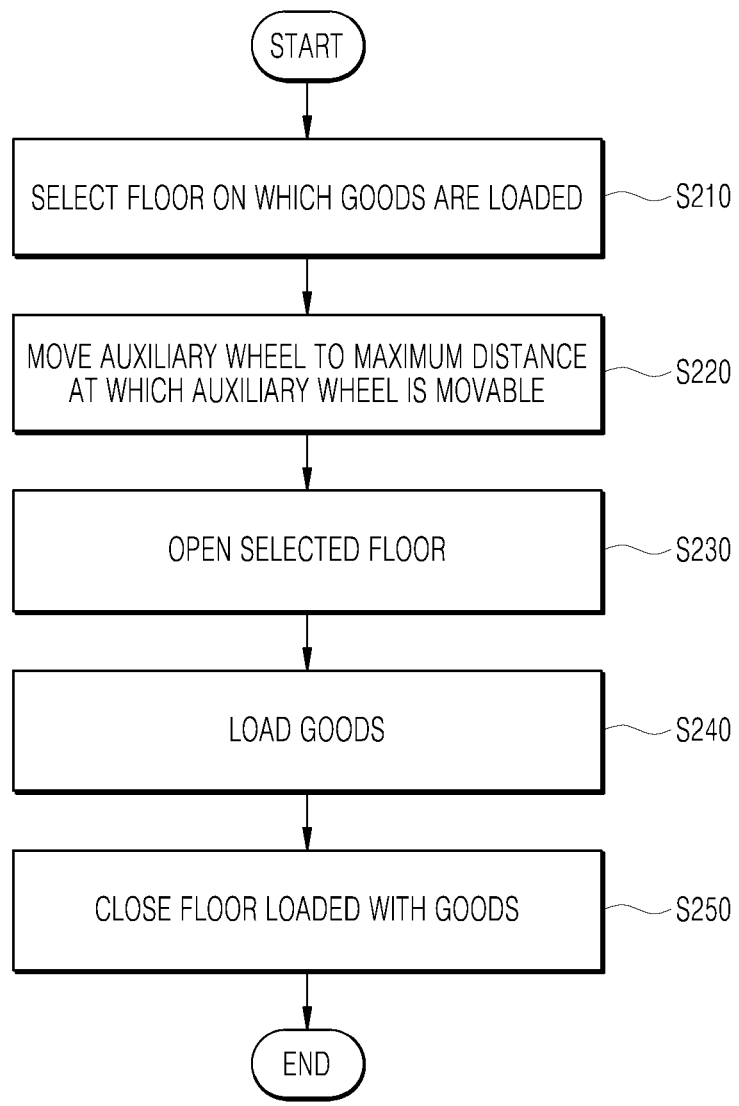
FIG. 11 is a flowchart illustrating a method for loading goods in the robot in the operation method of the robot according to an embodiment.

FIG. 11 is a flowchart illustrating a method for loading the goods in the operation method of the robot according to an embodiment.

The robot may select a floor in which the goods are loaded in the loading box 100 (operation S210).

The variable supporter 400 may move the auxiliary wheel 300 to the maximum position where the auxiliary wheel 300 is movable (operation S220). As described above, the length of (L1−L2) may be maximized so that it is possible to stably support the robot, and to suppress the robot from overturning due to the action of the moment in the loading process of the goods.

After the auxiliary wheel 300 moves in the outside direction of the robot, the robot may open the selected floor (operation S230). The robot may load the goods on the open floor of the loading box 100 (operation S240). The robot may close the floor loaded with the goods (operation S250).

After loading the goods, the robot drives to the delivery destination, and after arriving at the delivery destination, the robot may sequentially perform each operation after the operation S110 in order to withdraw the goods.

As described above in association with embodiments, although some cases were described, other various embodiments are possible. The technical contents of the embodiments described above may be combined in various ways unless they are not compatible, so new embodiments may be correspondingly implemented.

What is claimed is:

1. A robot capable of autonomous driving, the robot comprising:
    a loading box provided to load goods, and to be movable at a certain distance with respect to the robot when closed and opened;
    a drive wheel configured to drive the robot;
    an auxiliary wheel provided at a position spaced apart from the drive wheel;
    a variable supporter configured to change the position of the auxiliary wheel, and supporting the loading box; and
    a controller configured to control at least one of the loading box, the drive wheel, the auxiliary wheel, or the variable supporter,
    wherein the loading box is provided in a plurality of floors, and
    wherein, when at least one of the plurality of floors move in a first direction which is a direction toward an outside of the robot, the controller is further configured to:
        estimate a position of a center of gravity of the robot based on a weight distribution of the goods; and
        linearly move the auxiliary wheel in the first direction so that, with respect to the drive wheel, the position of the auxiliary wheel is located farther to the outside of the robot than the position of the center of gravity of the robot.

2. The robot of claim 1, wherein the variable supporter comprises
    a motor;

a linear mover mounted with the auxiliary wheel, and configured to move linearly;

a guider having one side fixed to the motor, and having another side coupled to the linear mover that is movable; and a screw having one side coupled to a rotary shaft of the motor to rotate together according to a rotation of the motor and having another side coupled to the linear mover that is movable to convert a rotational motion of the motor into a linear motion of the linear mover.

3. The robot of claim 1, wherein the variable supporter moves the auxiliary wheel in the first direction so that a first length measured from the drive wheel to the position of the auxiliary wheel in the first direction is equal to or longer than a second length measured from the drive wheel to the center of gravity of the robot in the first direction.

4. The robot of claim 1,
wherein each floor is provided with a pressure sensor configured to measure the weight distribution of the goods loaded in the loading box.

5. The robot of claim 4, wherein the controller estimates the position of the center of gravity of the robot based on the weight distribution of the goods measured from the pressure sensor and a structure of the robot.

6. The robot of claim 5, wherein the controller:
Holds a center of gravity data, which is information on the position of the center of gravity of the robot, according to the weight distribution of the goods and a movement of the loading box, and adjusts a first length of the variable supporter measured from the drive wheel to the position of the auxiliary wheel in the first direction based on the center of gravity data.

7. The robot of claim 6, wherein the center of gravity data holds information on the position of the center of gravity of the robot according to the weight distribution of the goods loaded in the loading box, a floor number loaded with the goods in the loading box, a movement distance of the loading box when the loading box is open, and a number of floors of the loading box.

8. The robot of claim 6, wherein the center of gravity data is derived by machine learning.

9. The robot of claim 8, wherein the center of gravity data is derived by supervised learning.

10. The robot of claim 9, wherein the supervised learning is performed so that training data
infers labeling data, which is a pre-derived result value of the center of gravity data, and derives a functional relationship between the position of the center of gravity of the robot, which is an output value, and an input value specifying the position of the center of gravity.

11. The robot of claim 8, wherein the center of gravity data holds information on the position of the center of gravity of the robot in each condition, in which at least one of a plurality of input values has been learned in different conditions, during the machine learning for deriving the center of gravity data of the robot.

12. The robot of claim 11, wherein the input values comprises the weight distribution of the goods loaded in the loading box, a floor number loaded with the goods in the loading box, a movement distance of the loading box when the loading box is open, and a number of floors of the loading box.

13. The robot of claim 1, wherein the robot further comprises a support wheel located to be spaced apart from each of the drive wheel and the auxiliary wheel, and configured to support the robot.

14. The robot of claim 1, wherein the variable supporter adjusts a movement speed of the auxiliary wheel so as to correspond to the movement speed of the center of gravity of the robot.

15. The robot of claim 1, wherein the robot further comprises a sensing sensor configured to sense an external obstacle, and
wherein the variable supporter adjusts a movement distance of the auxiliary wheel so that a distance between the external obstacle sensed by the sensing sensor and the auxiliary wheel are spaced at a certain distance apart from each other.

16. An operation method of a robot, comprising:
selecting a floor loaded with goods to be withdrawn from a loading box provided in a plurality of floors;

measuring a weight distribution of the goods loaded on the selected floor;

estimating a position of a center of gravity of the robot based on the weight distribution of the goods and a structure of the robot when the selected floor loaded with the goods is open in a first direction which is toward an outside of the robot;

setting a movement distance of an auxiliary wheel so that, with respect to a drive wheel of the robot, the position of the auxiliary wheel is located farther to the outside of the robot than the position of the center of gravity of the robot;

moving, by a variable supporter, the auxiliary wheel by the set movement distance; and opening the selected floor loaded with the goods,
wherein the variable supporter
moves the auxiliary wheel so as to correspond to a movement direction of the center of gravity of the robot, and moves the auxiliary wheel in the first direction so that a first length measured from a drive wheel of the robot to the auxiliary wheel in the first direction is equal to or longer than a second length measured from the drive wheel to the center of gravity of the robot in the first direction.

17. The operation method of the robot of claim 16, further comprising loading the goods in the loading box,
wherein in the loading the goods, the variable supporter moves the auxiliary wheel to a maximum distance at which the auxiliary wheel is movable.

18. The operation method of the robot of claim 17, wherein the loading the goods comprises
selecting a loading floor on which the goods will be loaded in the loading box;

moving, by the variable supporter, the auxiliary wheel to a maximum position at which the auxiliary wheel is movable;

opening the selected loading floor;

loading the goods on the selected loading floor; and closing the selected loading floor.

* * * * *